June 24, 1930.                S. N. HURT                1,768,480
                            WEIGHING SCALE
                          Filed April 8, 1929
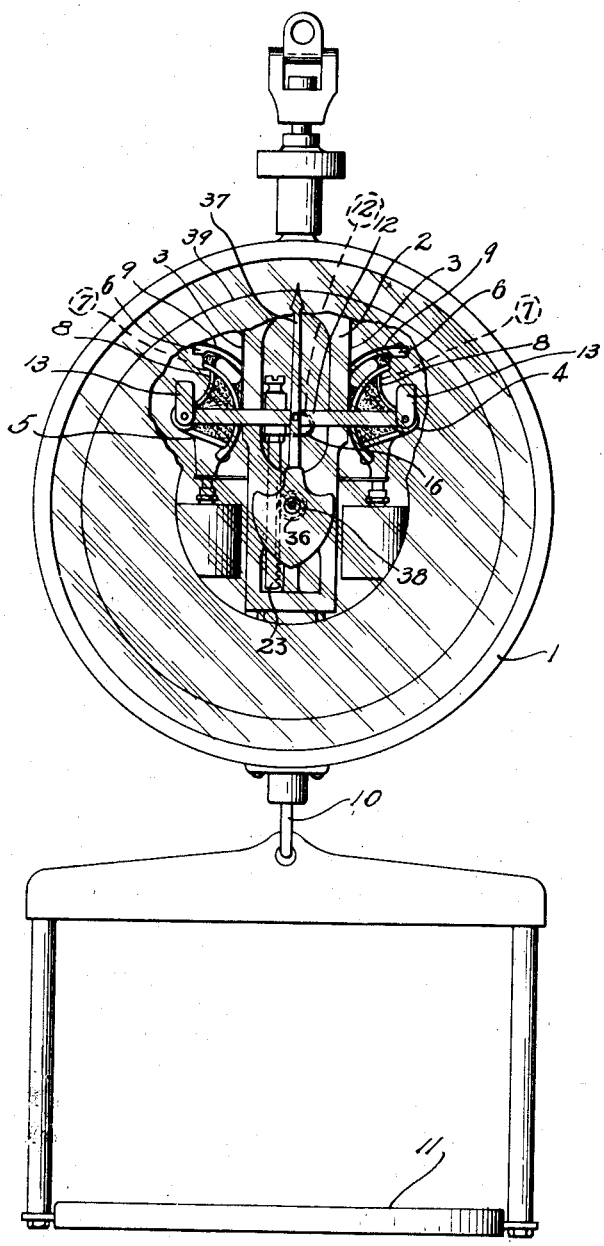
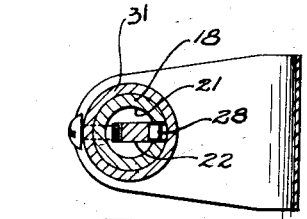
Fig. III.
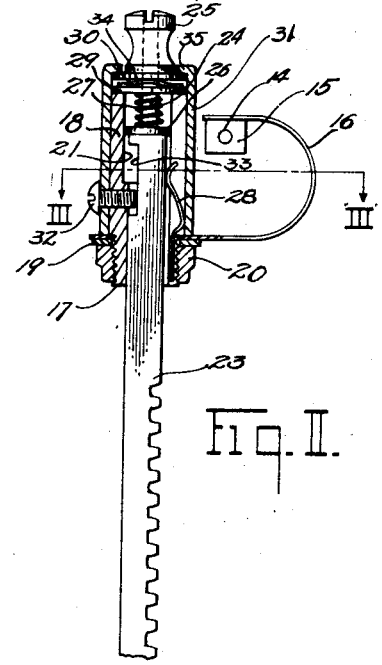
Fig. II.
Fig. I.
Inventor
Samuel N. Hurt.
By C. O. Marshall
Attorney Patented June 24, 1930

1,768,480

UNITED STATES PATENT OFFICE

SAMUEL N. HURT, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed April 8, 1929. Serial No. 353,333.

This invention relates to rack adjusting means and more particularly to rack adjusting means in scales giving the weight indication on a graduated chart or dial in conjunction with an indicator hand or pointer angularly movable over the graduated face of the dial, a distance proportional to the displacement of the weighing mechanism. One of the best known methods of imparting the desired movement to the indicator hand or pointer is to secure the hub of the indicator hand to a rotatable shaft, which also carries a pinion fixed thereon in position to mesh with a reciprocating rack suitably attached to and actuated by the weighing mechanism of the scale.

The principal object of this invention is the provision of means to maintain the reciprocating rack in exact alignment with the pinion without providing a manipulative locking means.

Another object of this invention is to provide means by which the rack may be adjusted in a vertical plane without removing any of the covers of the mechanism housing.

Another object is the provision of means preventing an axial twist of the rack with relation to the pinion.

A further object is a simple, yet efficient construction which may be made under modern production methods, and which requires no expensive machinery.

Other objects and advantages will be apparent from the following description, in which reference is had to the accompanying drawings, illustrating a preferred embodiment of the invention and wherein similar reference numerals designate similar parts throughout the several views.

In the drawings:—

Figure I is a front elevational view of a scale embodying my invention.

Figure II is an enlarged frontal view, partly in section, showing the rack supporting and adjusting devices of my invention.

Figure III is a sectional plan view, taken substantially on line III—III of Figure II.

Referring to the drawings in detail, the substantially watch-case-shaped housing 1 has suitably secured within it a guide frame 2. Suspended from it by flexible steel bands 3 are two pendulums 4 and 5, each comprising a power sector 6 and two fulcrum sectors 7 and 8 to which, at their lower extremity, the flexible steel bands 3 are fastened. Secured to the upper extremities of the power sectors 6 and overlying them, are flexible steel bands 9, whose lower ends are fastened to a yoke (not shown) from which by means of the connecting rod 10, the load pan 11 is suspended. Connecting the two pendulums 4 and 5 is a frame, comprising the side members 12 and the yokes 13. The trunnions 14 with which the rack shaft 15 is provided are mounted in bearings (not shown) midway between the ends of the side plates 12. A curved resilient shock absorbing plate 16, secured to the rack shaft 15 at one end, is provided on the other end with a circular aperture adapted to receive the cylindrical threaded portion 17 of the member 18. The washer 19 and the nut 20 clamp the member 18 securely to the flexible plate 16. The teeth of the rack 23 engage the teeth of the pinion 36, and the reciprocatory motion of the side bars 12, caused by the counterbalancing action of the pendulums 4 and 5, is thus translated into rotation.

The indicating hand or pointer 37 is secured to the pinion shaft (not shown) by its hub 38. The indicating hand thus points to the proper weight indicia printed or marked on the dial 39, as the angular movement of the indicating hand is proportional to the weight of the commodity on the pan 11. The member 18 is a cylindrical metallic body, the upper portion of which is provided with a drilled hole 21 extending longitudinally, for, substantially, one-half of the total length. The lower portion of the member 18 is provided with a milled slot 22, adapted to receive the rack 23. The rack at its upper extremity is provided with a threaded portion 24 adapted to engage the nut 25. Surrounding the threaded portion 24, and resting on the shoulder formed by the rack 23 is a collar 26, which snugly fits into the drilled out portion 21 of the member 18, thus preventing all lateral motion of that portion of the rack. The milled slot 22 in the lower portion of the member 18 contacting the rack 23 on three sides and the pressure member 28, co-operating with the guide formed by the collar 26, prevent all displacement of the axis of the rack. The expansive spring 27, which telescopes the threaded portion 24 and rests on the collar 26, presses upwardly against the disc 29, through it, a spring washer 30, and the flanged base 34 of the adjusting nut 25 against an inwardly extending flange 35 of the cover 31 which completely surrounds the member 18 and the therein enclosed co-operating parts. The cover 31 is retained by a screw 32 which is threaded into an aperture of the member 18. To prevent the disengagement of the rack the end of the screw 32 projects freely into a notch 33 cut into the rectangular body portion of the rack 23.

It will be readily seen that the construction of my improved device is such as to attain the objects of my invention. The rack 23, held by the milled slot 22 and guided by the collar 26, is thus constrained in vertical alignment and prevented from twisting axially. The spring 27 resting on the collar 26 and indirectly impinging against the inwardly extending flange 35 of the stationary cover 31 serves to press the rack normally downward. The spring washer 30 interposed between the disc 29 and the flange of the adjusting nut 25 serves to take up any lost motion and to supply a sufficient amount of friction to prevent change of adjustment through shocks or vibration. The adjustment of the relative position of the rack to the pinion is now a simple operation which may be performed with a screw driver through a suitable small opening in the scale housing, by a person only slightly acquainted with the scale mechanism. It is understood, however, that the invention is susceptible to variation, modification, and change within the spirit and scope of the invention as set forth in the subjoined claims.

Having described my invention, I claim:

1. In a weighing scale, in combination, load counterbalancing mechanism and indicating mechanism operated thereby, said indicating mechanism including a rack, means for adjusting said rack longitudinally, and automatically acting friction means to maintain said rack in adjustment.

2. In a weighing scale, in combination, load counterbalancing means, indicating means operated thereby, said indicating means comprising a resilient shock absorbing member, a rack, a longitudinal adjustment for said rack, a pointer co-operating with a pinion, means for maintaining said rack with its teeth in parallelism with the teeth of said pinion, and automatically acting friction means to maintain said rack in adjustment.

3. In a weighing scale, in combination, load counterbalancing means, indicating means operated thereby, said indicating means including a resilient shock absorbing member, a cylindrical body member having an opening adapted to receive a rack, means for retaining said rack in longitudinal alignment, expansive means urging said rack in one direction manipulative means for moving said rack in opposite direction, and friction locking means, including a formed resilient washer for maintaining said rack invariably in adjusted position.

4. In a weighing scale, in combination, load counterbalancing means and indicating means operated thereby, said indicating means including a resilient shock absorbing member, a cylindrical body member clamped thereto, said body member having a substantially rectangular opening in one end thereof, and a substantially cylindrical opening in the other end, a rack within said rectangular opening and means including a rack encircling collar for maintaining said rack in vertical alignment disposed within said substantially circular opening, manipulative means for adjusting said rack longitudinally, automatically acting friction means for locking said rack in adjustment and a tube-like member surrounding said means.

SAMUEL N. HURT.